US012608939B2

(12) United States Patent
Vishwakarma et al.

(10) Patent No.: US 12,608,939 B2
(45) Date of Patent: Apr. 21, 2026

(54) CONTENT-AWARE AI-ASSISTED VIDEO SUMMARIZATION

(71) Applicant: HITACHI, Ltd., Tokyo (JP)

(72) Inventors: Rahul Vishwakarma, Berkeley, CA (US); Ravigopal Vennelakanti, San Jose, CA (US); Nam Huyn, Milpitas, CA (US); Masato Tamura, Santa Clara, CA (US); Malarvizhi Sankaranarayanasamy, Mountain View, CA (US)

(73) Assignee: HITACHI, LTD., Tokyo (JP)

( * ) Notice: Subject to any disclaimer, the term of this patent is extended or adjusted under 35 U.S.C. 154(b) by 356 days.

(21) Appl. No.: 18/221,766

(22) Filed: Jul. 13, 2023

(65) Prior Publication Data

US 2025/0022273 A1 Jan. 16, 2025

(51) Int. Cl.
*G06V 20/40* (2022.01)
*G06T 7/00* (2017.01)
(Continued)

(52) U.S. Cl.
CPC ............ *G06V 20/47* (2022.01); *G06T 7/0002* (2013.01); *G06T 7/246* (2017.01); *G06V 20/176* (2022.01);
(Continued)

(58) Field of Classification Search
CPC . G06T 2207/10016; G06T 2207/20056; G06T 2207/20081; G06T 2207/30184;
(Continued)

(56) References Cited

U.S. PATENT DOCUMENTS 11,064,214 B2 7/2021 Banerji et al.
2021/0082098 A1* 3/2021 Kumbhare et al. ..... G06T 7/001
(Continued)

FOREIGN PATENT DOCUMENTS

WO 2022211781 A1 10/2022

*Primary Examiner* — Matthew C Bella
*Assistant Examiner* — Daniel Joseph Santos
(74) *Attorney, Agent, or Firm* — PROCOPIO, CORY, HARGREAVES & SAVITCH LLP

(57) ABSTRACT

Systems and methods for summarizing an infrastructure surface inspection video, which can involve processing frames of the infrastructure surface inspection video through a spatial in-frame process configured to conduct feature and text extraction on the frames on detected observations, the extracted features and text used to generate spatial metadata; processing the frames of the infrastructure surface inspection video through a temporal cross-frame process configured to detect changes across sequences of the frames including the spatial metadata, the temporal cross-frame process configured to generate temporal metadata encapsulating the detected changes; and processing the frames of the infrastructure surface inspection video through an activity decision process configured to intake the spatial metadata and temporal metadata to detect and track structural features or defects of interest as activity in the infrastructure surface inspection video and generate summary metadata from the spatial metadata, temporal metadata, and detected segments of interest.

15 Claims, 10 Drawing Sheets

(51) Int. Cl.
*G06T 7/246* (2017.01)
*G06V 20/10* (2022.01)
*G06V 30/19* (2022.01)

(52) U.S. Cl.
CPC .............. *G06V 20/41* (2022.01); *G06V 20/49* (2022.01); *G06V 30/19* (2022.01); *G06T 2207/10016* (2013.01); *G06T 2207/20056* (2013.01); *G06T 2207/30184* (2013.01); *G06V 2201/10* (2022.01)

(58) Field of Classification Search
CPC ......... G06T 7/0002; G06T 7/246; G06T 7/20; G06V 20/176; G06V 20/41; G06V 20/46; G06V 20/47; G06V 20/49; G06V 2201/10; G06V 30/19; G06V 20/42; G06V 20/44; G06V 20/52; G06V 10/82; G06K 9/00765; H04N 21/23418; G06F 16/783; G11B 27/031
USPC .......................................................... 382/173
See application file for complete search history.

(56) References Cited

U.S. PATENT DOCUMENTS

2023/0101112 A1\* 3/2023 Aguilar et al. ...... G01N 21/954
2024/0324852 A1\* 10/2024 Bouhnik et al. ..... A61B 1/0005

\* cited by examiner

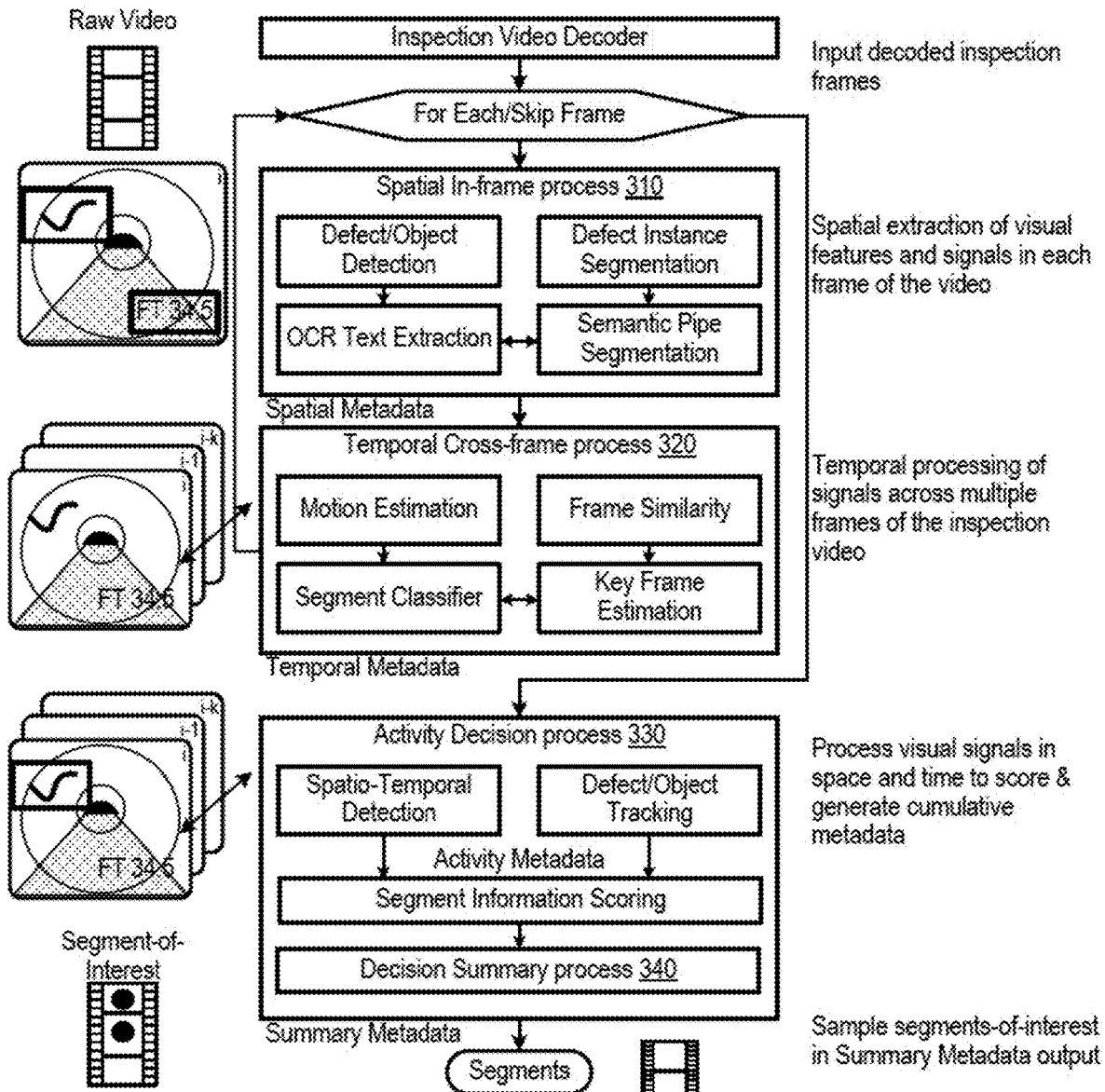

Raw Video

Inspection Video Decoder

Input decoded inspection frames

For Each/Skip Frame

FT 3×5

Spatial In-frame process 310

Defect/Object Detection     Defect Instance Segmentation

OCR Text Extraction     Semantic Pipe Segmentation

Spatial extraction of visual features and signals in each frame of the video

Spatial Metadata

Temporal Cross-frame process 320

Motion Estimation     Frame Similarity

Segment Classifier     Key Frame Estimation

FT 3×6

Temporal processing of signals across multiple frames of the inspection video

Temporal Metadata

Activity Decision process 330

Spatio-Temporal Detection     Defect/Object Tracking

Activity Metadata

Segment Information Scoring

Decision Summary process 340

FT 3×6

Process visual signals in space and time to score & generate cumulative metadata Segment-of-Interest Summary Metadata Segments Sample segments-of-interest in Summary Metadata output

FIG. 3

| Frame ID | Linear Feet | Temporal Seg | Temporal Meta | Spatial Seg | Spatial Meta | Activity Seg | Activity Meta | Inform Score | Summary Meta |
|---|---|---|---|---|---|---|---|---|---|
| #4000 | 36 | 0 | *SM=* (Similarity: 4.3, Stationary: 2.4) | 2 | [(DD, DS, TE, PS)] | 0 | [(S)] | 0.0 | ☒ |
| #4250 | 40 | 0 | (Similarity: 2.5, Stationary: 4.4) | 1 | None | 0 | None | 0.0 | ☒ |
| #4500 | 42 | 1 | (Similarity: 2.5, Stationary: 4.4) | 1 | [(DD, DS, TE, PS)] | 4 | [(S)] | 0.7 | ☑ |
| #4750 | 42 | 1 | (Similarity: 0, Stationary: 0) | 1 | [(DD, DS, TE, PS)] | 4 | [(S)] | 0.8 | ☑ |
| #5000 | 45 | 0 | (Similarity: 0, Stationary: 0) |  | None | 0 | None | 0.0 | ☒ |

FIG. 8

CONTENT-AWARE AI-ASSISTED VIDEO SUMMARIZATION

BACKGROUND

Field

The present disclosure is generally directed to infrastructure inspection systems, and more specifically, to video summarization systems for infrastructure inspection videos.

Related Art

North America has over 1.2 M Miles of sewage pipelines and only 10% of it is inspected annually. The current processes are manual in nature and can be inefficient. Pipeline Inspection is carried out using closed circuit television (CCTV) video data which is typically reviewed by Pipeline Assessment Certification Program (PACP) certified human coders to create a PACP condition report for Sewer Pipeline O&M activities. PACP coding is a human intensive task that requires a specialized training and certification by NASSCO. These experts are ageing, inconsistent, prone to errors or outdoor risks, and difficult to scale with the growing infrastructure needs. There are multiple Smart Utility AI products/services for automated coding, partial coding, defect extraction, human reviewed coding but none of them have managed to showcase clear market differentiators considering the errors and scale needed in such a solution.

FIG. 1 illustrates the related art inspection process that starts with camera rover deployed through an access manhole for CCTV data collection. An onsite operator drives the rover through the sewer pipeline and performs initial coding during this capture process, which is referred to as online coding. These raw videos are collected and sent to entities that offer review and coding services, which is referred to as the offline QA/QC process. This step offers the PACP report which serves as the evidence for planning maintenance and operation activities.

CCTV inspection video data is observed by onsite and offsite experts and much of the information within the video is unstructured before the data arrives for review and reporting. The inspection process itself is discontinuous in nature and shows up based on the situation at the site. The field operators can encounter difficult situations such as the camera falling underwater, or debris on the camera lens rendering a segment of video unusable. Some operators stop a lot more on structures or use the pan, tilt, zoom operation, showcasing a diverse collection rate and behavior. Observations or information is added directly to the video frame, and maintained in an unstructured manner in the related art.

In the related art, there is an object detection inference pipeline that is utilized for a computer vision based automated defect detection and coding system. This related art method is focused on detecting visual defects using object detection methods like You Only Look Once (YOLO) and applies rules to generate a PACP report.

Another related art implementation is a system and methodology for video compression, leveraging a signal processing approach to reduce the video by operating on multiple or consecutive video frames.

SUMMARY

In the related art, there are computer vision and object detection methods that are used for video defect analysis, coding or alternatively signal processing is used for video compression. The example implementations described herein approaches the problem from a video summarization perspective to provide the human reviewer a reduced video which has all the frames needed for reporting the necessary conditions or observations.

A human reviewer reviews the CCTV inspection video, which contains unstructured information coded into the frame or can only be detected using video analytics. There are many different features that a reviewer considers for assigning importance to a frame. It can be semantic in nature in which a pipeline wall structure or water level is an interesting feature. In other cases, activities like probing, coding, fixing an occlusion, and so on can be interesting to the reviewer. There can also be image-based information such as text metadata that appears within the frame including observations, defects, velocity or similarity of frames, and so on, which convey information which drives reviewer judgement.

Inspection videos have metadata information contained as an unstructured overlay in the frames rather than in a separate structured database. In the present disclosure, there are three technical problems to be addressed.

In a first technical problem with the related art, the CCTV inspection video length can be an hour long at ~30 frames/second. This makes the video detection results noisy, verbose and a major challenge in the related art, as such a problem leads to fatigue in human reviewers and is a major hurdle in economic viability.

In a second technical problem with the related art, the inspection video data has a lot of redundancy due to non-contiguous human inspection behavior. Human augmentation is economically viable if this technical problem can be addressed.

In a third technical problem with the related art, the artificial intelligence (AI)/video models are unable to recognize features or the start/end of observed video segments, as video time and linear feet travelled are not synchronized.

The technical problems make human review a time-consuming process and does not scale with the growing needs of the infrastructure condition assessment requirements. The example implementations target video summarization by leveraging unstructured information so that the human reviewer can focus on the interesting segments of the inspection data with an enhanced productivity gain.

In the present disclosure, the example implementations described herein provide a solution for the above technical problems in the manner mentioned below:

To address the first technical problem, the example implementations reduce the long form video into a set of non-redundant segments that are interesting for inspection review. A summarized video will allow human reviewer or automated models to spend less time on redundant sections and focus on observations.

To address the second technical problem, the example implementations incorporate inspection knowledge as visual features with start/end of segments, behavior of personnel, or defect features to sample key-frames or video segments-of-interest.

To address the third technical problem, the example implementations extract visual information such as common defects, structures, text overlayed in frame for inspection metadata and quantify the information contained in the frames.

Aspects of the present disclosure can involve a method for summarizing an infrastructure surface inspection video, which can involve processing frames of the infrastructure surface inspection video through a spatial in-frame process configured to conduct feature and text extraction on the frames on detected observations, the extracted features and text used to generate spatial metadata; processing the frames of the infrastructure surface inspection video through a temporal cross-frame process configured to detect changes across sequences of the frames including the spatial metadata, the temporal cross-frame process configured to generate temporal metadata encapsulating the detected changes; and processing the frames of the infrastructure surface inspection video through an activity decision process configured to intake the spatial metadata and temporal metadata to detect and track structural features or defects of interest as activity in the infrastructure surface inspection video and generate summary metadata from the spatial metadata, temporal metadata, and detected segments of interest.

Aspects of the present disclosure can involve a computer program for summarizing an infrastructure surface inspection video, which can involve instructions that include processing frames of the infrastructure surface inspection video through a spatial in-frame process configured to conduct feature and text extraction on the frames on detected observations, the extracted features and text used to generate spatial metadata; processing the frames of the infrastructure surface inspection video through a temporal cross-frame process configured to detect changes across sequences of the frames including the spatial metadata, the temporal cross-frame process configured to generate temporal metadata encapsulating the detected changes; and processing the frames of the infrastructure surface inspection video through an activity decision process configured to intake the spatial metadata and temporal metadata to detect and track structural features or defects of interest as activity in the infrastructure surface inspection video and generate summary metadata from the spatial metadata, temporal metadata, and detected segments of interest. The computer program can involve computer instructions that are stored in a non-transitory computer readable medium and executed by one or more processors.

Aspects of the present disclosure can involve a system for summarizing an infrastructure surface inspection video, which can involve means for processing frames of the infrastructure surface inspection video through a spatial in-frame process configured to conduct feature and text extraction on the frames on detected observations, the extracted features and text used to generate spatial metadata; means for processing the frames of the infrastructure surface inspection video through a temporal cross-frame process configured to detect changes across sequences of the frames including the spatial metadata, the temporal cross-frame process configured to generate temporal metadata encapsulating the detected changes; and means for processing the frames of the infrastructure surface inspection video through an activity decision process configured to intake the spatial metadata and temporal metadata to detect and track structural features or defects of interest as activity in the infrastructure surface inspection video and generate summary metadata from the spatial metadata, temporal metadata, and detected segments of interest.

Aspects of the present disclosure can involve an apparatus for summarizing an infrastructure surface inspection video, the apparatus involving a processor configured to process frames of the infrastructure surface inspection video through a spatial in-frame process configured to conduct feature and text extraction on the frames on detected observations, the extracted features and text used to generate spatial metadata; process the frames of the infrastructure surface inspection video through a temporal cross-frame process configured to detect changes across sequences of the frames including the spatial metadata, the temporal cross-frame process configured to generate temporal metadata encapsulating the detected changes; and process the frames of the infrastructure surface inspection video through an activity decision process configured to intake the spatial metadata and temporal metadata to detect and track structural features or defects of interest as activity in the infrastructure surface inspection video and generate summary metadata from the spatial metadata, temporal metadata, and detected segments of interest.

BRIEF DESCRIPTION OF DRAWINGS

FIG. 3 illustrates the Workflow AI Assisted Video Summary System, in accordance with an example implementation.

FIG. 8 illustrates the results summary metadata, in accordance with an example implementation.

DETAILED DESCRIPTION

Figure 1:
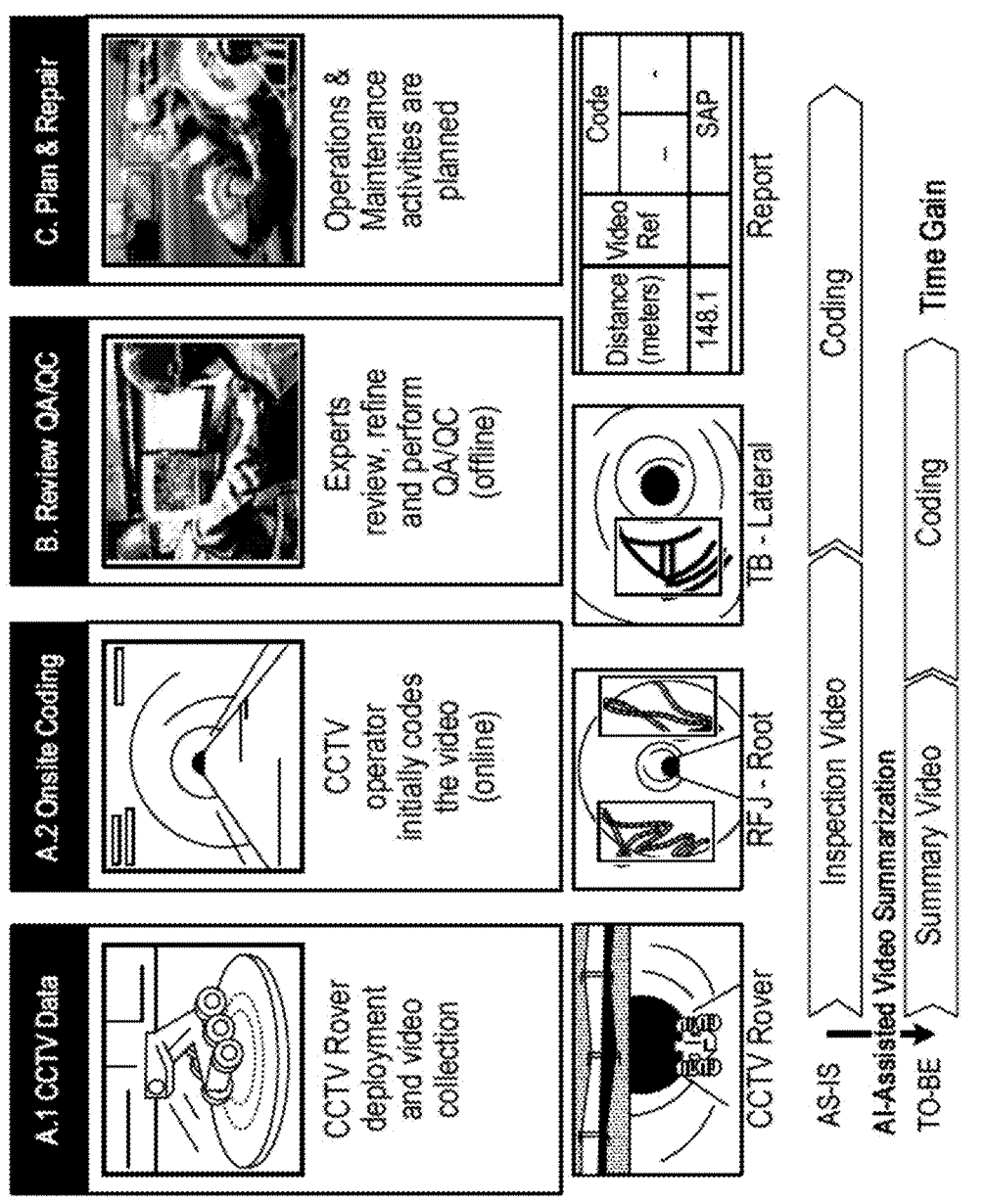
FIG. 1 is an overview of AS-IS and TO-BE process for manual CCTV Video based sewer pipeline inspection, coding and reporting by certified human experts.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Figure 2:
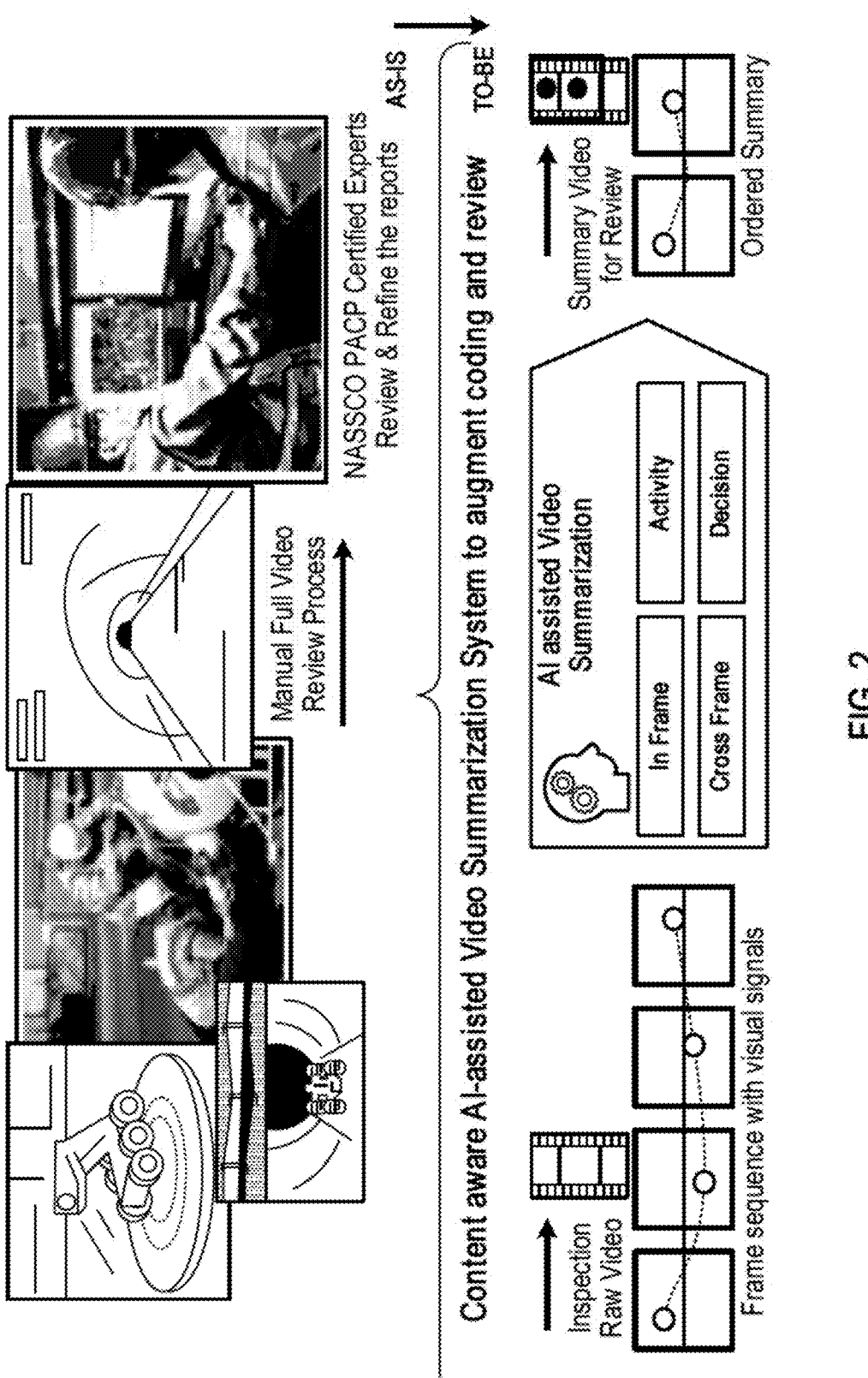
FIG. 2 illustrates an overview of AI assisted Video Summary System to facilitate efficient review by certified human experts, in accordance with an example implementation.

FIG. 2 illustrates an overview of AI assisted Video Summary System to facilitate efficient review by certified human experts, in accordance with an example implementation. The AI-assisted video summarization system described in FIG. 2 takes a long-form raw CCTV inspection video and processes its visual and unstructured signal though the core components of the example implementations described herein.

(a) Spatial In-frame Process: Extract visual objects in frame like common defects, structure, overlaid text for inspection metadata and quantify the information contained in the frames.

(b) Temporal Cross-frame Process: Reduce the long form video using a Cross-frame process by estimating motion and similarity between sequence of image frames.

(c) Activity Decision process: Inspection knowledge as visual activity with start/end of segments, behavior of camera rover or defect features to sample key-frames or video segments-of-interest.

(d) Decision Summary system to summarize based on the output of spatial, temporal and activity processes.

FIG. 3 illustrates the Workflow AI Assisted Video Summary System, in accordance with an example implementation. The video summarization system processes interesting features within a frame, across the frame sequence and from a video segment activity perspective to create a cumulative video summary metadata. This metadata can be used to reduce the original video into summary segments or understand the inspection behavior during the collection process.

(a) Spatial In-frame Process 310 component leverages AI based computer vision models to detect defects and pipeline features from each image frame. Additionally, it can extract text information based on an image frame sample from inspection video which includes metadata such as current time, inspection location, distance travelled and more as embedded in the frame.

(b) Temporal Cross-frame Process 320 component incorporates tracking or motion estimation techniques like Optical flow to classify stationary segments and similarity across subsequent image frames in a video to estimate redundancy or keyframes (c) Activity Decision Process 330 component analyses visual signals in space and time by defect tracking and activity detection to score visual information contained in a segment or sequence of frames.

(d) Decision Summary 340 generates reduction summary metadata by automatically selecting segments-of-interest in an AI-assisted video summarization user interface.

Ultimately the summary metadata generated by the Decision Summary process 340 contains the segments of interest that needs attention from expert reviewers for reporting purposes. This result can be used for creating a summary video or to understand the inspection process.

Figure 4:
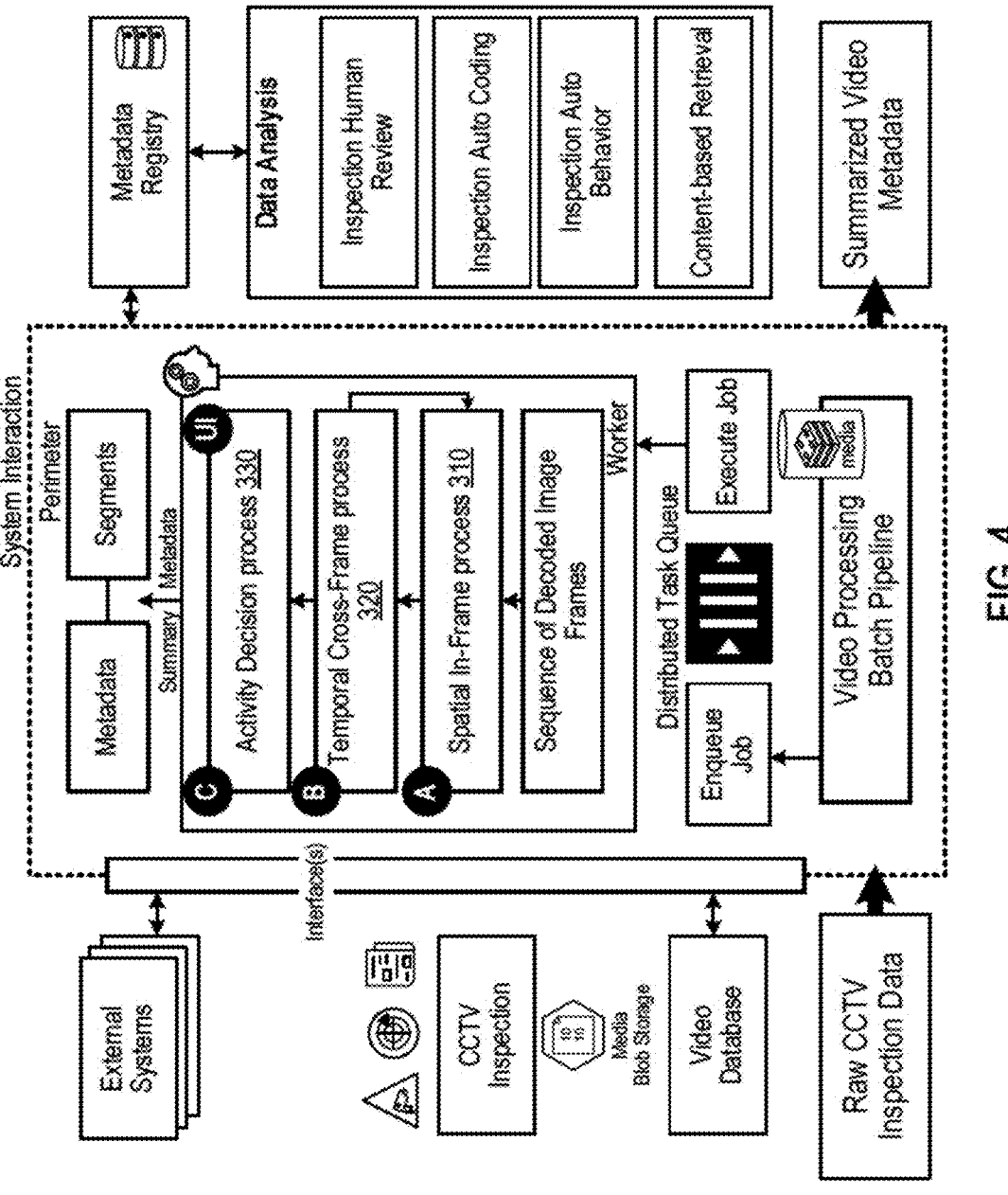
FIG. 4 is a diagram of the System Interaction, in accordance with an example implementation.

The example implementations summarize the raw CCTV inspection data by leveraging core components such as (a) spatial in-frame process, (b) temporal cross-frame process. (c) activity decision process and (d) decision summarization user interface. FIG. 4 is a diagram of the system interaction, in accordance with an example implementation. Specifically, FIG. 4 describes the system interaction from left to right. The raw CCTV inspection videos are collected by field operators and shared in disks or a cloud storage environment. A video processing pipeline is responsible for executing various models on the available video files. These videos are enqueued for distributed, parallel and asynchronous execution using a task queue system. Workers listen to the task queue for executing the summarization processes and generating the summary metadata. Job state and execution result data is maintained in a key-value storage system such as a Redis database. The resulting summary metadata is maintained in a registry which can be queried by multiple systems.

Summary metadata can be useful for multiple purposes and can be queried from its registry. This registry can be queried by data analysis systems for operations optimization, business improvement, and decision making through inspections. Additionally, this can also contribute towards human-centric review systems, automatic coding systems, inspection behavior analysis, content retrieval systems. External systems that need video summarization, AI-assistance of summary recommendation can access the system described in the example implementations.

The four components of the example implementations work together to additively generate the metadata needed for summarization of the video based on its contents.

Figure 5:
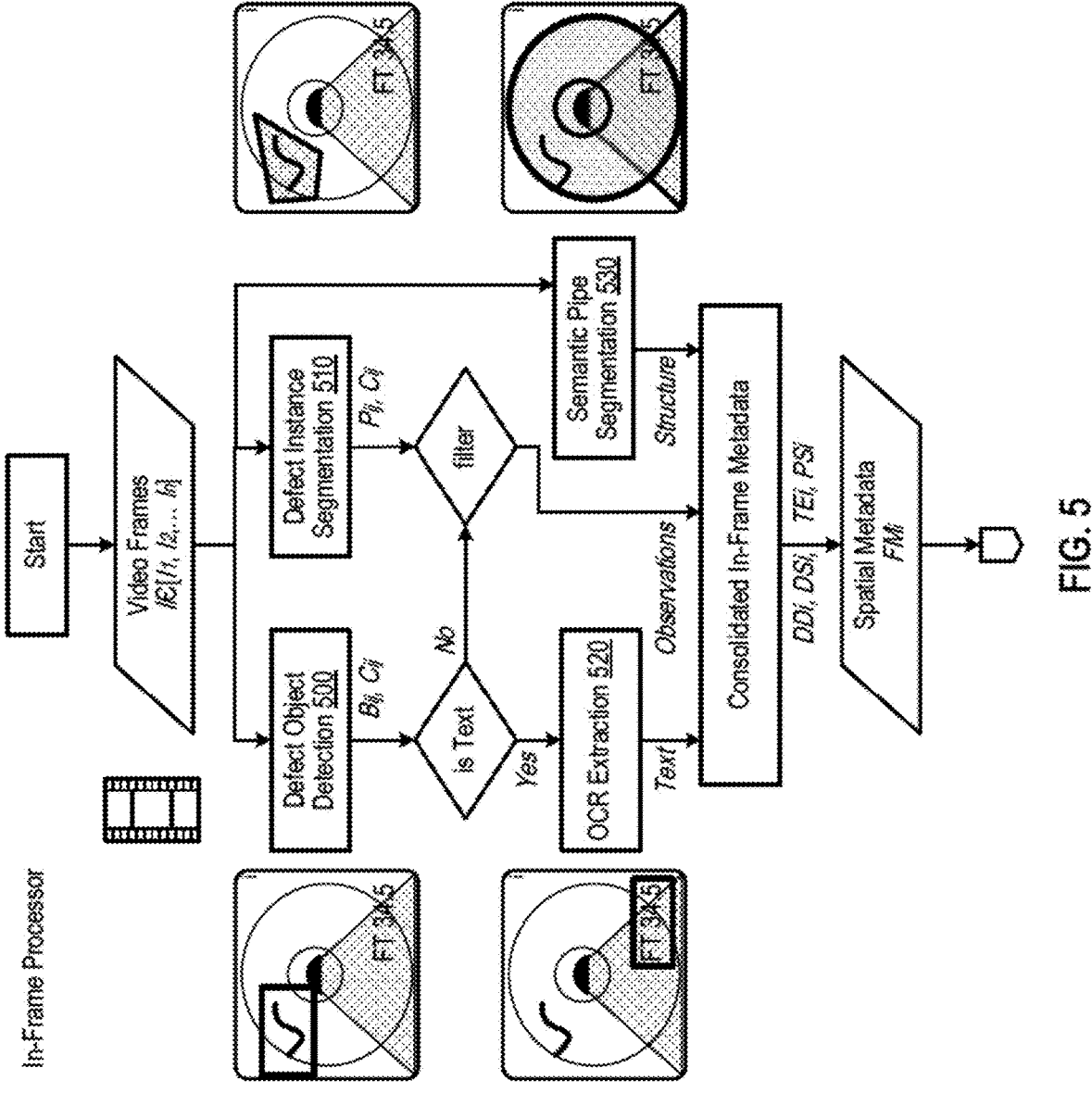
FIG. 5 illustrates the spatial in-frame processing workflow for spatial metadata, in accordance with an example implementation.

FIG. 5 illustrates the spatial in-frame processing workflow for spatial metadata, in accordance with an example implementation. The spatial in-frame process component leverages AI based computer vision models to detect defects and pipeline features from each image frame including the text information.

Computer vision techniques such as object detection, instance segmentation, semantic segmentation and text extraction using OCR (Optical Character Recognition) is performed on each frame to observe defects, region influenced by each defect, pipeline structures and text information coded by the onsite operator respectively. Spatial in-frame processing workflow is executed on $i^{th}$ video frame represented by video "I" as described in FIG. 5. Instance segmentation is refined by objection detection while other modules are attributes of spatial metadata computed for each frame.

Defect Object Detection $DD_i$ 500: Computer vision-based object detection analysis on $i^{th}$ video frame to propose rectangular box $B_{ij}$ $(x_1y_1x_2y_2)$ for $j^{th}$ defect class label $(C_{ij})$ representing one of the many cracks or fractures identified within the frame. Popular object detection algorithm like YOLO or Faster Region-based Convolutional Neural Network (RCNN) in the supervised Deep learning approach or HOG or SIFT based feature descriptor in the unsupervised case are used for defect detection.

Defect Segmentation $DS_i$ 510: Computer vision-based instance segmentation analysis on $i^{th}$ video frame to propose closed polygonal segment $P_{ij}$ for $j^{th}$ defect class label $(C_{ij})$ representing a tighter bound on surface defect features such as a circumferential crack or hole. Popular instance segmentation algorithms such as Mask-RCNN in the supervised Deep learning approach or Unsupervised clustering methods can be used for defect segmentation.

Text Extraction $TE_i$ 520: Extract text information embedded in the $i^{th}$ frame using OCR. This information can represent the linear-feet distance travelled in the pipeline or defect coding information that can be mined for additional knowledge.

Pipe Semantic Segmentation $PS_i$ 530: Computer vision based semantic segmentation for pixel level assignment of a category label for water, pipe or other structural elements observed in the $i^{th}$ frame. A U-Net modification of Convolutional Neural Network in the supervised Deep learning approach and traditional Watershed image processing algorithms can be used to segment the pipeline structure. This can help determine overlapping defects and a better understanding of geometry in the pipeline.

Figure 6:
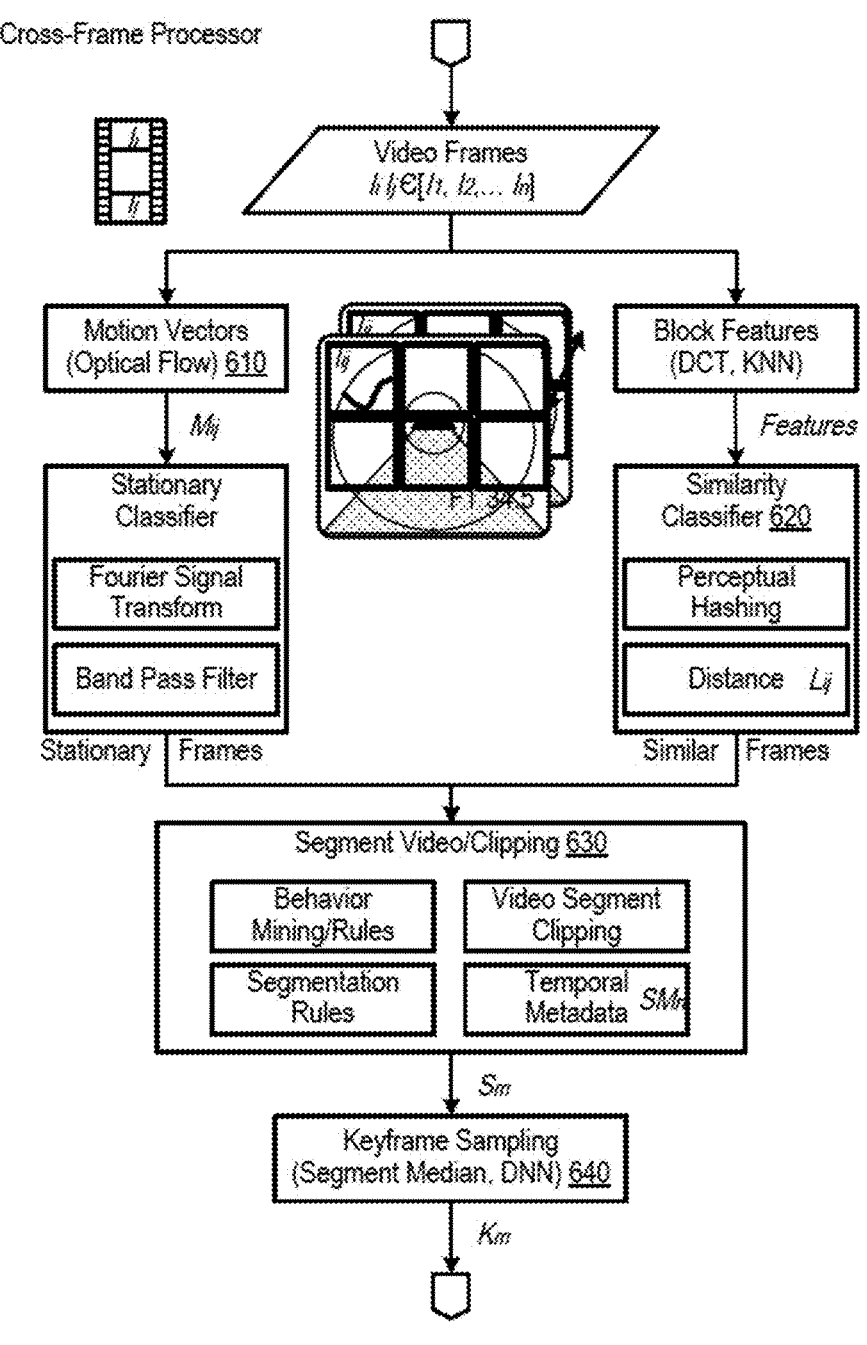
FIG. 6 illustrates the cross-frame processing workflow, in accordance with an example implementation.

FIG. 6 illustrates the cross-frame processing workflow, in accordance with an example implementation. The temporal cross-frame process component incorporates tracking or motion estimation techniques to understand stationarity, similarity, or redundancy in the inspection video.

Computer vision techniques such as motion and similarity estimation are performed on a pair or sequence of frames to understand if the frames represent a situation where camera is stationary or looking at the same frames. Motion vector and feature similarity is computed on $i^{th}$ and $j^{th}$ video frame sequence represented by video "I" as described in FIG. 6. A grid level sampling is used to classify stationary and similar frames in the given sequence. Computed motion and block features are then used to segment the video representing the inspection start and end motion segments.

Motion Estimate $M_{ij}$ 610: Pixel, grid or frame level traditional or deep learning based optical flow estimate between $i^{th}$ and $j^{th}$ frame. Optical flow vectors can approximate the velocity of the real video camera traversing down the pipeline. Example implementations described herein leverage a Band-pass filter approach on Fourier transform of the motion vector to obtain the stationary signals. A central tendency on the stationary signal is used to classify stationary frames.

Frame Similarity $L_{ij}$ 620: Similarity is computed on the extracted features from a pair of image samples from the video frame sequence. Feature extraction can leverage DCT, KNN algorithm or an encoded hash value of these features depending on the desired implementation. Manhattan, Euclidean, Cosine distance or divergence estimate provides a quantitative similarity between $i^{th}$ and $j^{th}$ image frame.

Segment Video $S_m$ 630: Video segment can be determined using a smoothened step function. Whenever a camera rover stops moving, a segment can thereby be started, and when it resumes, that observation segment can be ended. $S_m$ can be $m^{th}$ sequence of frames or segment with start and end identifier clustered based on motion and similarity estimation. The stationarity and similarity thresholds are configured as a part of segmentation rules responsible for tuning the temporal metadata output.

Keyframe Estimate $K_m$ 640: Candidate keyframe identifier within a set of similar frame or segment that represents the information within a segment. Segment median or a Deep Neural Network (DNN) based keyframe estimation can be used to select a keyframe from a segment.

Figure 7:
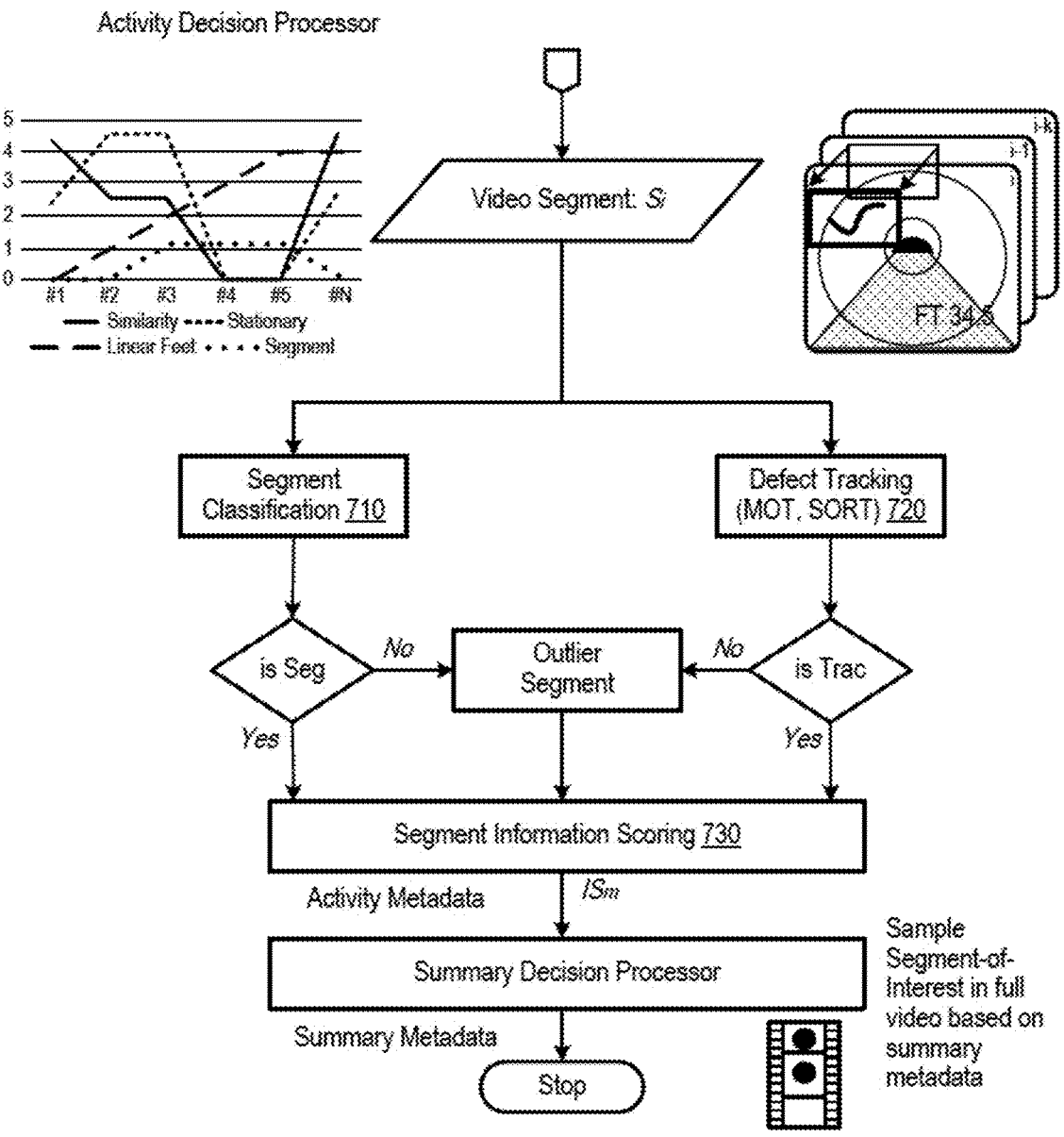
FIG. 7 illustrates the activity and segment decision processing workflow, in accordance with an example implementation.

FIG. 7 illustrates the activity and segment decision processing workflow, in accordance with an example implementation. Activity Decision Process component analyses visual signals in space and time by defect tracking and activity detection to score visual information contained in a segment or sequence of frames.

Signal processing techniques such as pattern matching and clustering can be used to identify segments-of interest. In FIG. 7, the segment classification selects the sequence where stationary and similar signals align indicating that vehicle stopped and then started moving in that segment. Alternatively, in case of a sequence of frames with tracked defects segment is preserved in entirety. Both these sequences qualify as a valid segment of interest and is additive to the segment information, while if the segment is an outlier, it may be ignored in the scoring algorithms for Activity metadata.

Activity $A_m$ 710: Identify the segments $S_i$ that have stationary and similar frames and classify the segment with stationary activity. In order to classify activity, supervised support vector machine (SVM) is leveraged or Ensemble approach to identify if a segment is interesting. Training dataset can be leveraging from a Database which contains the frames that have observations. An unsupervised method can use a simple step function to determine aligned similarity and stationary signals for classification.

Track $T_m$ 720: Identify the segments that contains long continuous tracks or short defect tracks. Popular object tracking algorithms such as MOT and SORT can be used to estimate the segments length. Continuous defects will have tracks extending over three linear-feet and will be segmented as a separate activity.

Segment Information $IS_m$ 730: Segment information is scored additively leveraging normalized frame level detections, temporal detections, segment classification and tracking. A high $IS_m$ score can be foreseen where more information converges and zero where none exists. All the reported attributes are a part of Activity Metadata.

FIG. 8 illustrates the results summary metadata, in accordance with an example implementation. Decision Summary generates reduction summary metadata by automatically selecting segments-of-interest in an AI-assisted video summarization user interface. Information scoring allows for highlighting of a suggested segment that can be selected manually or automatically for preserving in the summary metadata result file.

The automated decision summary works on information scoring principle where accumulated metadata information from all components are assessed to create a normalized score. The rationale for this is that in case there are multiple defects and there is some activity in this segment then the score is high. Alternatively, if there are no spatial detections and frame appears stationary then there is no interesting information there and can be dropped in the summary video.

Summary Metadata: Summary metadata accumulates metadata from spatial process (defect instance, segmentation, text, and pipeline segmentation), temporal process (motion estimate, frame similarity, clips, keyframe), and activity process (clip activity, tracking). The accumulated data is represented in a simplified tabular form in FIG. 8 representing frame level metadata in each row of this table. There can be many ways to present this data, and one of the metadata forms can be a graph with time series structure representing a video. A registry can persist this information and allow for complex query on this data structure for content retrieval. A data analysis system can query this structure to understand the regions or segments of interest in one or multiple inspection videos.

Ultimately the summary metadata generated by the Decision Summary process contains the segments of interest that needs attention from expert reviewers for reporting purposes. This result can be used for creating a summary video or to understand the inspection process.

Figure 9:
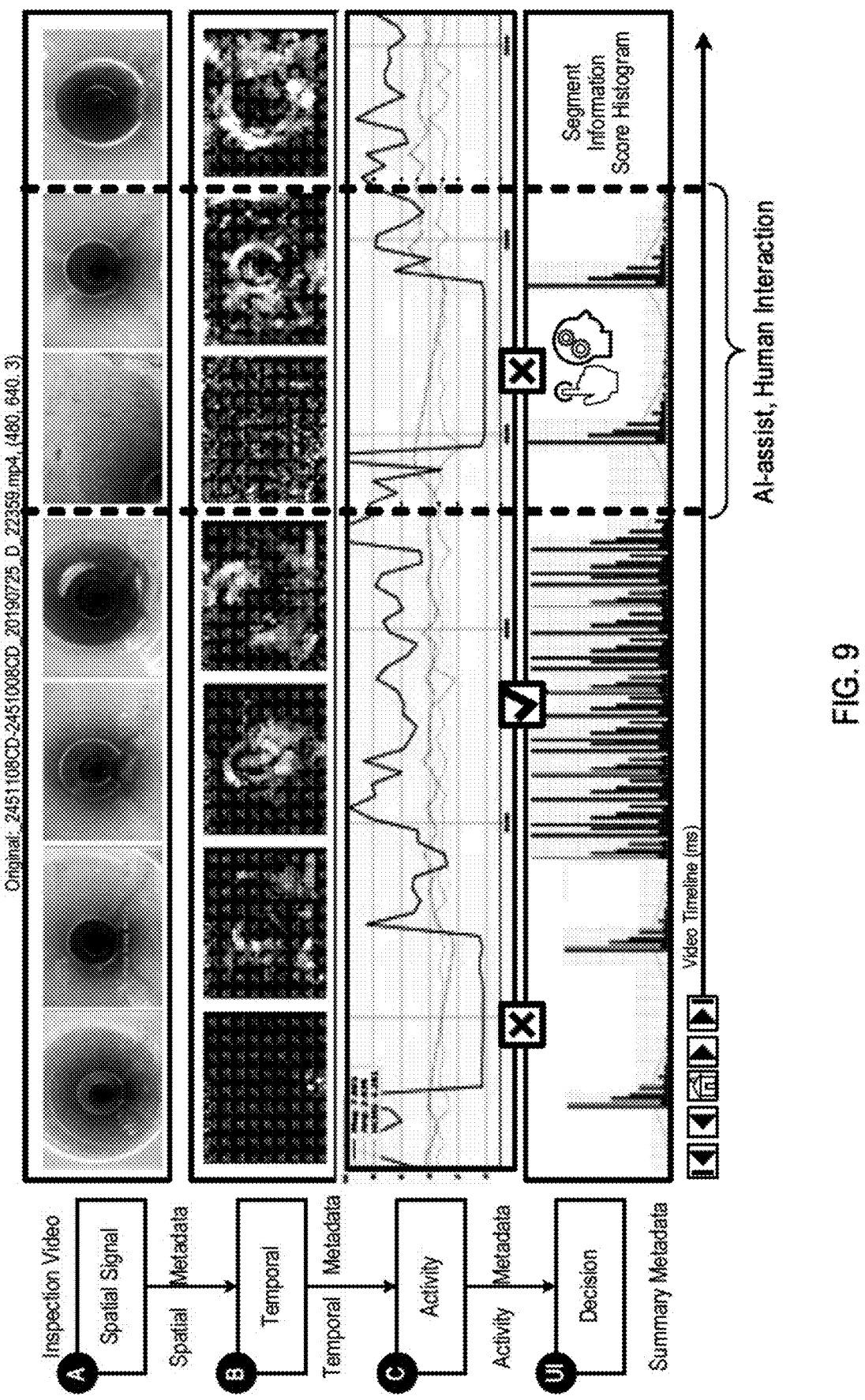
FIG. 9 is a snapshot of the AI-assisted Summarization user interface for human augmentation, in accordance with an example implementation.

FIG. 9 is a snapshot of the AI-assisted Summarization user interface for human augmentation, in accordance with an example implementation. In the decision interface of FIG. 9, the summary workflow is designed such that each component can be visualized in isolation or altogether as illustrated. The accumulative nature of summary metadata allows for extraction of visual signals in-frame and across frame in the top two rows and feed that into the Activity process visualization for scoring of the interesting segments. The bottom layer is the AI-assisted interactive decision timeline that highlights the frames that can be removed. Summary metadata drives the decision as it contains information from all components as well as the information score histogram that drives the final frame or segment level decision on this interactive decision layer in the user interface.

A prolonged video review period generates fatigue in humans and can lead to errors. In the proposed example implementations, the information contained in the system is quantified to reduce the length of the video to limited segments of interest. The temporal motion information contained in the video provides inspection knowledge about the behavior of the operator. This enables the system to clip the long video into segments so that we a continuous observation can be obtained within a segment. Finally, the example implementations attempt to detect observations and extract the overlayed text information from the video frame to obtain the metadata added by the onsite operator.

Through the example implementations described herein, a summarized video will allow human coders or automated models to spend less time on redundant sections and efficiently focus on observations.

Through the example implementations described herein, temporal stationarity, frame similarity, structural observations or defect activity tracking will allow targeted sampling of key-frames for accurate video start/end sections or segments-of-interest.

Through the example implementations described herein, metadata written to the frames can incorporate on-site coding information that can help characterize the data, common visual features as well as the inspection personnel activity.

The example implementations described herein further allow extraction of visual metadata from CCTV inspection videos to summarize it into interesting segments that increases reviewer productivity. This has a direct impact on the time spent for quality check, quality assurance purposes and revenue gains.

In additional example implementations, there can be faster automated defect coding involving an AI based review or coding system that can leverage this summary metadata to automatically code the video segments of interest with lesser General Processing Unit (GPU) runtime.

In additional example implementations, inspection behavior can be understood better by understanding the velocity or stopping frequency of the camera rover.

In additional example implementations, there can be a query or image-based retrieval of similar images which can be used to search or retrieve similar frames or segments from a large registry of segments using the hash similarity approach.

In additional example implementations, there can also be a human safety or situation awareness incorporated into the system to signal or notify of any risk that can be visually identified as a part of its detection process.

In additional example implementations described herein, there can also be an information quality assessment and audit system in which the information scoring component is used to generate information quality assessment for high- and low-quality data from service guarantee and audit perspective.

In additional example implementations, there can be a blockchain for trusted sensing metadata in which blockchain extensions for single source of truth for always-on inspection edge devices that is communicating visual metadata in an Internet of Things (IoT) sensor network.

Although example implementations described herein are described with respect to sewage pipes, other infrastructure involving inspection videos with long segments of similar frames may also benefit from the example implementations described herein, and the present disclosure is not limited thereto. For example, pipelines or tunnels (e.g., natural gas pipelines, subway tunnels, oil and gas pipelines), bridges, highways, and the like having long and similar video frames as traversed by a camera rover may also fall under the example implementations described herein to reduce the number of frames required for human inspection.

Figure 10:
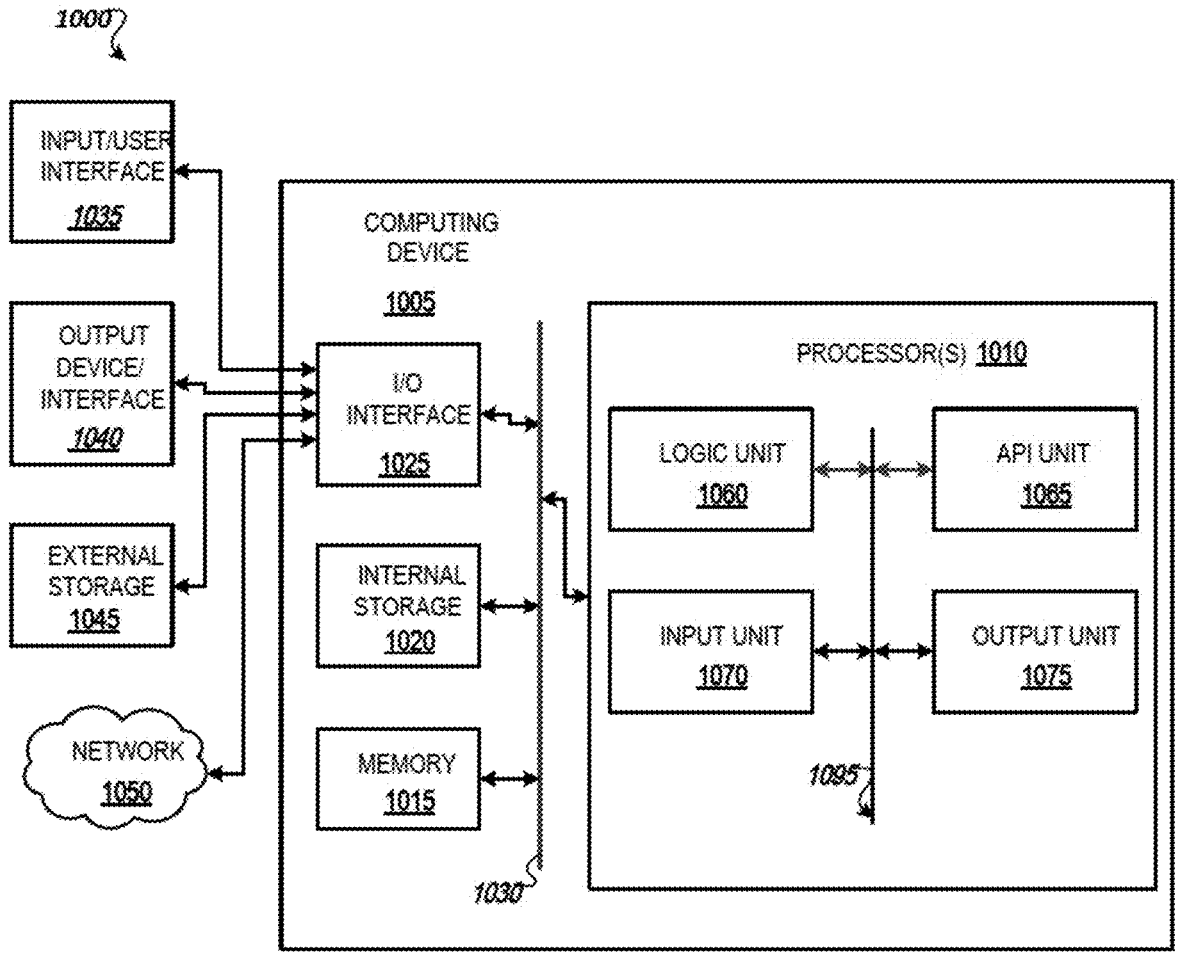
FIG. 10 illustrates an example computing environment with an example computer device suitable for use in some example implementations.

FIG. 10 illustrates an example computing environment with an example computer device suitable for use in some example implementations. Computer device 1005 in computing environment 1000 can include one or more processing units, cores, or processors 1010, memory 1015 (e.g., RAM, ROM, and/or the like), internal storage 1020 (e.g., magnetic, optical, solid-state storage, and/or organic), and/or IO interface 1025, any of which can be coupled on a communication mechanism or bus 1030 for communicating information or embedded in the computer device 1005. IO interface 1025 is also configured to receive images from cameras or provide images to projectors or displays, depending on the desired implementation.

Computer device 1005 can be communicatively coupled to input/user interface 1035 and output device/interface 1040. Either one or both of the input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1040 may include a display, television, monitor, printer, speaker, braille, or the like. In some example implementations, input/user interface 1035 and output device/interface 1040 can be embedded with or physically coupled to the computer device 1005. In other example implementations, other computer devices may function as or provide the functions of input/user interface 1035 and output device/interface 1040 for a computer device 1005.

Examples of computer device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1005 can be communicatively coupled (e.g., via IO interface 1025) to external storage 1045 and network 1050 for communicating with any number of networked components, devices, and systems, including one or more computer devices of the same or different configuration. Computer device 1005 or any connected computer device can be functioning as, providing services of, or referred to as a server, client, thin server, general machine, special-purpose machine, or another label.

IO interface 1025 can include but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computer device 1005 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1010 can execute under any operating system (OS) (not shown), in a native or virtual environment. One or more applications can be deployed that include logic unit 1060, application programming interface (API) unit 1065, input unit 1070, output unit 1075, and inter-unit communication mechanism 1095 for the different units to communicate with each other, with the OS, and with other applications (not shown). The described units and elements can be varied in design, function, configuration, or implementation and are not limited to the descriptions provided. Processor(s) 1010 can be in the form of hardware processors such as central processing units (CPUs) or in a combination of hardware and software units.

In some example implementations, when information or an execution instruction is received by API unit 1065, it may be communicated to one or more other units (e.g., logic unit 1060, input unit 1070, output unit 1075). In some instances, logic unit 1060 may be configured to control the information flow among the units and direct the services provided by API unit 1065, the input unit 1070, the output unit 1075, in some example implementations described above. For example, the flow of one or more processes or implementations may be controlled by logic unit 1060 alone or in conjunction with API unit 1065. The input unit 1070 may be configured to obtain input for the calculations described in the example implementations, and the output unit 1075 may be configured to provide an output based on the calculations described in example implementations.

Processor(s) 1010 can be configured to execute a method or computer instructions for summarizing an infrastructure surface inspection video as illustrated in FIGS. 3 and 4, involving processing frames of the infrastructure surface inspection video through a spatial in-frame process configured to conduct feature and text extraction on the frames on detected observations, the extracted features and text used to generate spatial metadata as illustrated in FIG. 5; processing the frames of the infrastructure surface inspection video through a temporal cross-frame process configured to detect changes across sequences of the frames including the spatial metadata, the temporal cross-frame process configured to generate temporal metadata encapsulating the detected changes as illustrated in FIG. 6; and processing the frames of the infrastructure surface inspection video through an activity decision process configured to intake the spatial metadata and temporal metadata to detect and track structural features or defects of interest as activity in the infrastructure surface inspection video and generate summary metadata from the spatial metadata, temporal metadata, and detected segments of interest as illustrated in FIG. 7. Through the above method or computer instructions, it is therefore possible to improve on accuracy over the related art, which only averages 30% in accuracy and falls short of business requirements that require at least 90% accuracy.

The example implementations described herein can address business requirements that require at least 90% accuracy.

Processor(s) 1010 can be configured to execute the methods or instructions as described above, wherein the processing frames of the infrastructure surface inspection video through a spatial in-frame process that can involve executing a first computer-vision machine learning process (e.g., defect object detection) on the frames configured to detect the observations (e.g., structural features of the sewage pipe or defects) from feature extraction and to put labels involving text on the frames to indicate the detected observations on the frames; for text annotations being detected from executing optical character recognition on the frames processed by the first computer-vision machine learning process: the processor(s) 1010 can execute methods or instructions involving incorporating the extracted features and the detected text into the spatial metadata for ones of the frames having detected text; incorporating defect segmentation (e.g., a process of identifying and localizing given classes of objects present in an image) corresponding to the detected text into the spatial metadata for the ones of the frames having detected text, the defect segmentation generated from a second computer-vision machine learning process (e.g., defect instance segmentation) configured to conduct defect segmentation on the frames; and executing a third computer-vision machine learning process on the frames to provide semantic segmentation (e.g., a process of partitioning an image into visually homogeneous areas) for infrastructure elements, the third computer-vision machine learning process (e.g., semantic pipe segmentation) configured to provide structure segments to be incorporated into the spatial metadata as illustrated in FIG. 5.

Processor(s) 1010 can be configured to execute the methods or instructions as described above, and further involve processing the frames of the infrastructure surface inspection video through a temporal cross-frame process including conducting an optical flow estimate process to estimate velocity of a camera moving through a sewage pipe corresponding to the frames indicated in the spatial metadata, the optical flow estimate process configured to provide an optical flow vector representative of the estimated velocity; obtaining stationary signals indicative of the frames recorded by the camera when the camera is stationary from executing a band pass filter on a Fourier transform of the optical flow vector; computing frame similarity of the frames based on feature extraction and detections to determine the changes across the frames; temporally segmenting the sequences of frames that are associated with the stationary signals for estimating camera rover motion (e.g., motion start signal, motion end signal); extracting keyframes (e.g., representative image frames in a video clip) from the segmented sequences of frames based on the computed frame similarity and detections; and incorporating the extracted key frames into the temporal metadata as illustrated in FIG. 6.

Processor(s) 1010 can be configured to execute the method or instructions described above, wherein the processing the frames through the activity decision process involving identifying segments from the frames that have stationary and similar frames sequence; classifying the segments based on stationary activity; tracking detections, the temporal segments having continuous defects (e.g., defects that have a minimum extent along the length of a sewage pipe) or short defects as activity; scoring the segments based on the stationary activity, the tracked detections and existence of continuous defects or short defects as activity metadata; and incorporating the spatial metadata, temporal metadata, and the activity metadata into a summary metadata with the identified segments having a score beyond a threshold, the identified segments having the score beyond a threshold being the detected segments of interest as illustrated in FIG. 7.

Processor(s) 1010 can be configured to execute the methods or instructions as described above, and further involve providing a user interface configured to display frames of the infrastructure surface inspection video as processed by the spatial in-frame process, the temporal cross-frame process, and the activity decision process, and to provide the metadata generated by the summarization process for automated reporting or user selection display of the segments of interest as illustrated in FIG. 9. Through the above method or instructions, the example implementations can facilitate a user interface displaying frames of the surface inspection video as processed by as each of the processes from FIG. 3 to FIG. 7, and can facilitate an automated or user selected approach. Such example implementations can further improve accuracy by highlighting important segments for the user for review, and display findings that need to go to the inspection report. The operator can accept or correct the findings all the human operator needs to do is to accept or correct those findings through the user interface. Accordingly, the user interface can provide an automated video summarization based on the information score in the summary metadata, and the user can accept/reject/edit decision summary results within the user interface.

Depending on the desired implementation, the infrastructure surface inspection video can be a video of a pipeline captured by a camera rover that moves down the length of the pipeline, such as a sewage pipe as described herein.

Depending on the desired implementation, the infrastructure surface inspection video is a video of one or more of a tunnel or a surface of an infrastructure captured by a camera rover as described herein.

Depending on the desired implementation, the spatial metadata can involve one or more of pixel motion or detected objects as illustrated in FIG. 8.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for summarizing an infrastructure surface inspection video, comprising:

processing frames of the infrastructure surface inspection video through a spatial in-frame process configured to conduct feature and text extraction on the frames on detected observations, the extracted features and text used to generate spatial metadata;

processing the frames of the infrastructure surface inspection video through a temporal cross-frame process configured to detect changes across sequences of the frames including the spatial metadata, the temporal cross-frame process configured to generate temporal metadata encapsulating the detected changes, the temporal cross-frame process comprising:

conducting an optical flow estimate process to estimate velocity of a camera moving through a sewage pipe corresponding to the frames indicated in the spatial metadata, the optical flow estimate process configured to provide an optical flow vector representative of the estimated velocity; and obtaining stationary signals indicative of the frames recorded by the camera when the camera is stationary from executing a band pass filter on a Fourier transform of the optical flow vector; and processing the frames of the infrastructure surface inspection video through an activity decision process configured to intake the spatial metadata and the temporal metadata to detect and track structural features or defects of interest as activity in the infrastructure surface inspection video and generate summary metadata from the spatial metadata, the temporal metadata, and detected segments of interest.

2. The method of claim 1, wherein the processing frames of the infrastructure surface inspection video through the spatial in-frame process comprises:

executing a first computer-vision machine learning process on the frames configured to detect the observations from feature extraction and to put labels comprising text on the frames to indicate the detected observations on the frames;

for text annotations being detected from executing optical character recognition on the frames processed by the first computer-vision machine learning process:

incorporating the extracted features and the detected text into the spatial metadata for ones of the frames having detected text;

incorporating defect segmentation corresponding to the detected text into the spatial metadata for the ones of the frames having detected text, the defect segmentation generated from a second computer-vision machine learning process configured to conduct defect segmentation on the frames; and executing a third computer-vision machine learning process on the frames to provide semantic segmentation for infrastructure elements, the third computer-vision machine learning process configured to provide structure segments to be incorporated into the spatial metadata.

3. The method of claim 1, wherein the processing the frames through the activity decision process comprises:

identifying segments from the frames that have stationary and similar frames sequence;

classifying the segments based on stationary activity;

tracking detections, and the temporal segments having continuous defects or short defects as activity;

scoring the segments based on the stationary activity, tracked detections and existence of continuous defects or short defects as activity metadata; and incorporating the spatial metadata, the temporal metadata, and the activity metadata into the summary metadata with the identified segments having a score beyond a threshold, the identified segments having the score beyond the threshold being the detected segments of interest.

4. The method of claim 1, further comprising:

providing a user interface configured to display frames of the infrastructure surface inspection video as processed by the spatial in-frame process, the temporal cross-frame process, and the activity decision process, and to provide the metadata generated by the summarization process for automated reporting or user selection display of the segments of interest.

5. The method of claim 1, wherein the infrastructure surface inspection video is a video of a pipeline captured by a camera rover that moves down a length of the pipeline.

6. The method of claim 1, wherein the infrastructure surface inspection video is a video of one or more of a tunnel or a surface of an infrastructure captured by a camera rover.

7. The method of claim 1, wherein the spatial metadata comprises one or more of pixel motion or detected objects.

8. A non-transitory computer readable medium, storing instructions for summarizing an infrastructure surface inspection video, the instructions comprising:

processing frames of the infrastructure surface inspection video through a spatial in-frame process configured to conduct feature and text extraction on the frames on detected observations, the extracted features and text used to generate spatial metadata;

processing the frames of the infrastructure surface inspection video through a temporal cross-frame process configured to detect changes across sequences of the frames including the spatial metadata, the temporal cross-frame process configured to generate temporal metadata encapsulating the detected changes, the temporal cross-frame process comprising:

conducting an optical flow estimate process to estimate velocity of a camera moving through a sewage pipe corresponding to the frames indicated in the spatial metadata, the optical flow estimate process configured to provide an optical flow vector representative of the estimated velocity; and obtaining stationary signals indicative of the frames recorded by the camera when the camera is stationary from executing a band pass filter on a Fourier transform of the optical flow vector; and processing the frames of the infrastructure surface inspection video through an activity decision process configured to intake the spatial metadata and the temporal metadata to detect and track structural features or defects of interest as activity in the infrastructure surface inspection video and generate summary metadata from the spatial metadata, the temporal metadata, and detected segments of interest.

9. The non-transitory computer readable medium of claim 8, wherein the processing frames of the infrastructure surface inspection video through the spatial in-frame process comprises:

executing a first computer-vision machine learning process on the frames configured to detect the observations from feature extraction and to put labels comprising text on the frames to indicate the detected observations on the frames;

for text annotations being detected from executing optical character recognition on the frames processed by the first computer-vision machine learning process:

incorporating the extracted features and the detected text into the spatial metadata for ones of the frames having detected text;

incorporating defect segmentation corresponding to the detected text into the spatial metadata for the ones of the frames having detected text, the defect segmentation generated from a second computer-vision machine learning process configured to conduct defect segmentation on the frames; and executing a third computer-vision machine learning process on the frames to provide semantic segmentation for infrastructure elements, the third computer-vision machine learning process configured to provide structure segments to be incorporated into the spatial metadata.

10. The non-transitory computer readable medium of claim 8, wherein the processing the frames through the activity decision process comprises:

identifying segments from the frames that have stationary and similar frames sequence;

classifying the segments based on stationary activity;

tracking detections, and the temporal segments having continuous defects or short defects as activity;

scoring the segments based on the stationary activity, tracked detections and existence of continuous defects or short defects as activity metadata; and incorporating the spatial metadata, the temporal metadata, and the activity metadata into the summary metadata with the identified segments having a score beyond a threshold, the identified segments having the score beyond the threshold being the detected segments of interest.

11. The non-transitory computer readable medium of claim 8, wherein the instructions further comprises:

providing a user interface configured to display frames of the infrastructure surface inspection video as processed by the spatial in-frame process, the temporal cross-frame process, and the activity decision process, and to provide the metadata generated by the summarization process for automated reporting or user selection display of the segments of interest.

12. The non-transitory computer readable medium of claim 8, wherein the infrastructure surface inspection video is a video of a pipeline captured by a camera rover that moves down a length of the pipeline.

13. The non-transitory computer readable medium of claim 8, wherein the infrastructure surface inspection video is a video of one or more of a tunnel or a surface of an infrastructure captured by a camera rover.

14. The non-transitory computer readable medium of claim 8, wherein the spatial metadata comprises one or more of pixel motion and detected objects.

15. An apparatus for summarizing an infrastructure surface inspection video, the apparatus comprising:

a processor, configured to:

process frames of the infrastructure surface inspection video through a spatial in-frame process configured to conduct feature and text extraction on the frames on detected observations, the extracted features and text used to generate spatial metadata;

process the frames of the infrastructure surface inspection video through a temporal cross-frame process configured to detect changes across sequences of the frames including the spatial metadata, the temporal cross-frame process configured to generate temporal metadata encapsulating the detected changes, the temporal cross-frame process comprising:

conducting an optical flow estimate process to estimate velocity of a camera moving through a sewage pipe corresponding to the frames indicated in the spatial metadata, the optical flow estimate process configured to provide an optical flow vector representative of the estimated velocity; and obtaining stationary signals indicative of the frames recorded by the camera when the camera is stationary from executing a band pass filter on a Fourier transform of the optical flow vector;

and process the frames of the infrastructure surface inspection video through an activity decision process configured to intake the spatial metadata and the temporal metadata to detect and track structural features or defects of interest as activity in the infrastructure surface inspection video and generate summary metadata from the spatial metadata, the temporal metadata, and detected segments of interest.

* * * * *